United States Patent
Lin

(10) Patent No.: US 10,273,158 B2
(45) Date of Patent: Apr. 30, 2019

(54) METHOD FOR MANUFACTURING GRAPHENE COMPOSITE FILM

(71) Applicant: I-SHOU UNIVERSITY, Kaohsiung (TW)

(72) Inventor: Chiung-Fang Lin, Kaohsiung (TW)

(73) Assignee: I-Shou University, Kaohsiung (TW)

(*) Notice: Subject to any disclaimer, the term of this patent is extended or adjusted under 35 U.S.C. 154(b) by 0 days.

(21) Appl. No.: 15/679,223

(22) Filed: Aug. 17, 2017

(65) Prior Publication Data
US 2018/0022610 A1    Jan. 25, 2018

Related U.S. Application Data

(63) Continuation-in-part of application No. 14/982,619, filed on Dec. 29, 2015, now abandoned.

(51) Int. Cl.
| | |
|---|---|
| *C01B 32/184* | (2017.01) |
| *C01B 32/182* | (2017.01) |
| *C01B 39/02* | (2006.01) |
| *H01B 1/16* | (2006.01) |
| *H01B 1/18* | (2006.01) |
| *B01F 11/02* | (2006.01) |
| *B29D 7/01* | (2006.01) |

(52) U.S. Cl.
CPC ............ *C01B 32/184* (2017.08); *B01F 11/02* (2013.01); *B29D 7/01* (2013.01); *C01B 39/02* (2013.01); *H01B 1/16* (2013.01); *H01B 1/18* (2013.01); *B29K 2995/0041* (2013.01); *C01B 2204/04* (2013.01); *C01B 2204/22* (2013.01)

(58) Field of Classification Search
CPC ... C01B 23/184; C01B 39/02; C01B 2204/04; C01B 2204/22; B01F 11/02; B29D 7/01; H01B 1/16; H01B 1/18; B29K 2995/0041
USPC .......................................................... 427/557
See application file for complete search history.

(56) References Cited

U.S. PATENT DOCUMENTS

| | | |
|---|---|---|
| 9,040,126 B2 | 5/2015 | Lin |
| 2011/0130494 A1 | 6/2011 | Penicaud et al. |
| 2011/0186789 A1* | 8/2011 | Samulski ............... B82Y 30/00 252/514 |
| 2012/0171418 A1 | 7/2012 | Lin et al. |
| 2014/0170336 A1 | 6/2014 | Lin |
| 2014/0323596 A1 | 10/2014 | Jeong et al. |

FOREIGN PATENT DOCUMENTS

| | | | |
|---|---|---|---|
| CN | 102642830 A | 8/2012 | |
| JP | 2014043357 | * 3/2014 | |
| JP | 2014043357 A | 3/2014 | |
| TW | I477449 B | 3/2015 | |
| WO | WO-2014125292 A1 * | 8/2014 | ............ H01L 35/22 |
| WO | WO2014125292 A1 | 8/2014 | |

OTHER PUBLICATIONS

JP 2014043357 Machine Translation, originally published 2014, p. 1-16 (Year: 2014).*

* cited by examiner

*Primary Examiner* — David P Turocy
(74) *Attorney, Agent, or Firm* — Alan D. Kamrath; Kamrath IP Lawfirm, P.A.

(57) ABSTRACT

A method for manufacturing a graphene composite film includes preparing a zeolite suspension containing zeolite nanocrystals with a concentration of 50-100 ppm and with a particle size of 50-80 nm. The zeolite suspension has a pH value of 11-13. A graphene oxide suspension containing graphene oxide with a concentration of 50-200 ppm is mixed with the zeolite suspension to form a composite solution. The composite solution is transferred into a 15° C. water bath when a color of the composite solution turns from brownish-yellow into deep brown. A surfactant is added into the composite solution in the 15° C. water bath. The composite solution is then sonicated for 5-30 minutes and removed out of the 15° C. water bath, with the color of the composite solution turning from deep brown into black. The composite solution is further processed to form a graphene composite film having not more than 5 layers.

9 Claims, 9 Drawing Sheets

METHOD FOR MANUFACTURING GRAPHENE COMPOSITE FILM

CROSS REFERENCE TO RELATED APPLICATIONS

This is a continuation-in-part application of U.S. patent application Ser. No. 14/982,619 filed on Dec. 29, 2015, now abandoned, the entire contents of which are incorporated herein by reference.

BACKGROUND OF THE INVENTION

1. Field of the Invention

The present invention generally relates to a method for manufacturing a composite film and, more particularly, to a method for manufacturing a fewer-layer graphene composite film.

2. Description of the Related Art

Graphene possesses many advantages including excellent mechanical properties, high thermal conductivity, high electron mobility, and a high specific surface area. However, graphene produced via oxidation-reduction methods aggregate easily due to variation of temperature or pH value in the processing steps of the oxidation-reduction methods and the subsequent extrusion process. Accordingly, the specific surface area of the resultant graphene decreases significantly, and the electrical properties of the resultant graphene are also adversely affected, resulting in reduced applicability. On the other hand, graphene dispersed in a solution can be easily mixed with selected raw materials to form a composition, which can be utilized to fabricate graphene composite materials with enhanced properties. These composite materials possess excellent mechanical and electrical properties and are suitable for further processing, providing a wide variety of applications.

Zeolite includes uniformly distributed pores and excellent resistances to heat and compression. Hence, a composite material, such as a graphene composite film, made of a mixture of graphene and zeolite is more structurally-stable than pure graphene. Besides, with the tri-dimensional structure of zeolite, the electron mobility of the graphene composite film can be further increased, which is favorable for a redox reaction. Hence, the graphene composite film can be applied in supercapacitors and sensors.

A conventional method for manufacturing a graphene composite film uses graphene produced by an oxidation-reduction method. The conventional method includes preparing a graphene oxide suspension and a zeolite suspension, reducing the graphene oxide suspension to form a graphene suspension, and mixing the graphene suspension with the zeolite suspension. Next, the mixture of the graphene suspension and the zeolite suspension is applied on a substrate by spin coating and is baked at a high temperature for several hours to form the graphene composite film.

However, the graphene used in the conventional method produced through an oxidation-reduction method usually has more than ten layers, which is thick and which tends to result in product defects. Besides, the graphene composite film produced from the graphene-containing mixture via spin coating has poor electrical properties, uneven thickness, a rough surface, and weak adhesion with the substrate, adversely affecting the applicability of the composite graphene film.

SUMMARY OF THE INVENTION

It is therefore an objective of this invention to overcome the above problems by providing a method for manufacturing a fewer-layer graphene composite film with improved electrical properties, a uniform thickness, and a smooth surface.

The present invention provides a method for manufacturing a graphene composite film including:

(a) preparing a zeolite suspension containing zeolite nanocrystals with a concentration of 50-100 ppm, with a particle size of the zeolite nanocrystals being 50-80 nm, and with the zeolite suspension having a pH value of 11-13;

(b) preparing a graphene oxide suspension containing graphene oxide with a concentration of 50-200 ppm;

(c) mixing the graphene oxide suspension with the zeolite suspension according to a volume ratio of 1:1 to 9:1 to form a composite solution and transferring the composite solution into a 15° C. water bath when a color of the composite solution turns from brownish-yellow into deep brown;

(d) adding a surfactant into the composite solution in the 15° C. water bath;

(e) sonicating the composite solution after step (d) for 5-30 minutes and removing the composite solution out of the 15° C. water bath, with the color of the composite solution turning from deep brown into black;

(f) atomizing the composite solution after step (e) to form atomized droplets;

(g) treating the atomized droplets with a plasma to charge the atomized droplets; and (h) depositing the charged atomized droplets on a substrate having a temperature of 150-350° C., forming a graphene composite film having not more than 5 layers.

In an example, step (c) can include adding an alkali into the graphene oxide suspension and sonicating the graphene oxide suspension containing the alkali at 50-90° C. to turn the color of the composite solution from brownish-yellow into deep brown. Thus, defects of the partially-reduced graphene oxide can be prevented.

In an example, step (e) can include sonicating the composite solution for 12-24 hours at 50-90° C. to turn the color of the composite solution from deep brown into black, achieving further reduction.

In an example, the surfactant used in step (d) is 1-methy-2-pyrrolidone, isopropanol (NMP), propylene glycol methyl ether (PGME), ethyl acetate or methyl ethyl ketone (MEK). The alkali can reduce the number of layers of the graphene.

In an example, the zeolite suspension in step (a) further comprises a metal salt to increase the specific capacitance of the graphene composite film.

In an example, the metal salt is a salt of gold, platinum, silver, copper or nickel to increase the specific capacitance of the graphene composite film.

In an example, step (d) further includes sonicating the mixture of the reduced graphene oxide suspension and the zeolite suspension for 1-3 hours before adding the surfactant. Thus, the number of layers of the graphene can be reduced.

In an example, step (g) includes using a gas to carry the atomized droplets through the plasma. Thus, bonding between the graphene composite film and the substrate is enhanced.

In an example, the gas is argon, helium or a mixed gas comprising argon and hydrogen to prevent the graphene from being oxidized again or further reduced.

According to the method for manufacturing the graphene composite film of the present invention, the alkaline zeolite suspension is added during the procedure for reducing the graphene oxide to graphene and, thus, can not only serve as a reductant but contributes formation of zeolite nanocrystals between two adjacent graphene layers in the composite solution. Furthermore, the composite solution is placed in a 15° C. water bath to slow down the reduction rate, and a surfactant is added to provide a better dispersion effect of the graphene oxide and the zeolite nanocrystals in the composite solution, thereby controlling the reduction rate of reducing graphene oxide to graphene. Thus, the resultant graphene has fewer layers and fewer defects, improving the electrical properties of the graphene.

Furthermore, since the graphene composite film is formed from the composite solution by plasma-enhanced atomizing deposition, the graphene envelops the zeolite nanocrystals. Consequently, the zeolite nanocrystals and the graphene jointly form the graphene composite film with a smooth surface and a uniform thickness, improving the applicability of the graphene composite film.

Furthermore, by adding the metal salt into the zeolite suspension, metal ions can enter the zeolite nanocrystals to increase the specific capacitance of the graphene composite film.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE INVENTION

Figure 1A:
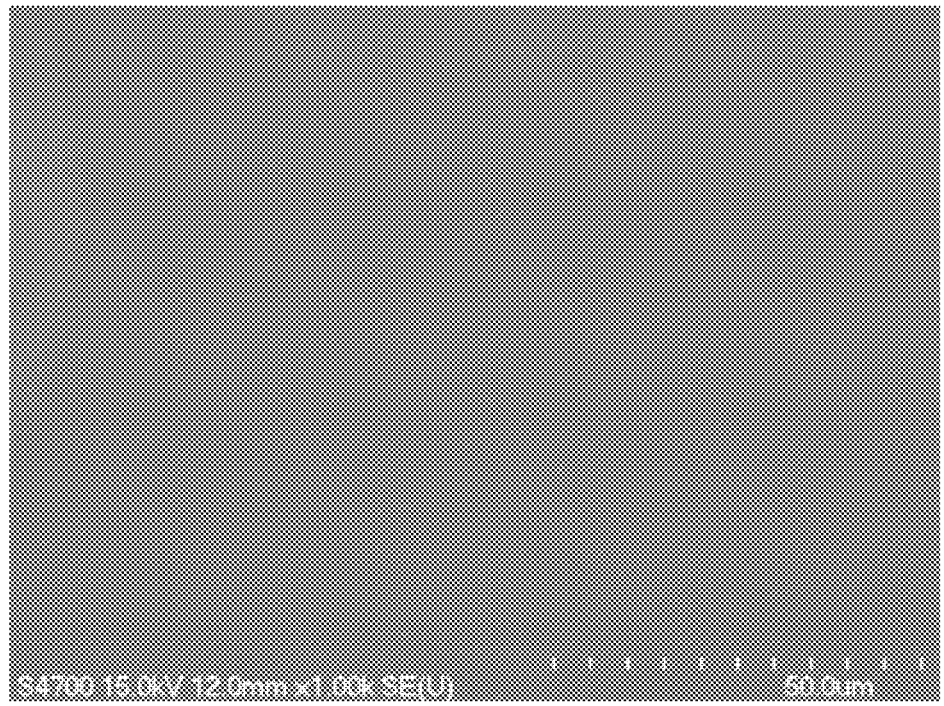
FIG. 1a is a 1,000×SEM image of the graphene composite film of Group B1.

A method for manufacturing a graphene composite film includes:
(a) preparing a zeolite suspension containing zeolite nanocrystals with a concentration of 50-100 ppm, with a particle size of the zeolite nanocrystals being 50-80 nm, and with the zeolite suspension having a pH value of 11-13;
(b) preparing a graphene oxide suspension containing graphene oxide with a concentration of 50-200 ppm;
(c) mixing the graphene oxide suspension with the zeolite suspension according to a volume ratio of 1:1 to 9:1 to form a composite solution and transferring the composite solution into a 15° C. water bath when a color of the composite solution turns from brownish-yellow into deep brown;
(d) adding a surfactant into the composite solution in the 15° C. water bath;
(e) sonicating the composite solution after step (d) for 5-30 minutes and removing the composite solution out of the 15° C. water bath, with the color of the composite solution turning from deep brown into black;
(f) atomizing the composite solution after step (e) to form atomized droplets;
(g) treating the atomized droplets with a plasma to charge the atomized droplets; and
(h) depositing the charged atomized droplets on a substrate having a temperature of 150-350° C., forming a graphene composite film having not more than 5 layers.

Specifically, the zeolite suspension in step (a) contains zeolite nanocrystals with a particle size of 50-80 nm, and the concentration of the zeolite suspension is 50-100 ppm. The zeolite suspension can be prepared through, but is not limited to, any known method in the art, and the pH value of the zeolite suspension can be 11-13. For example, the zeolite nanocrystals can be aluminosilicate zeolite and can have a chemical formula of $M_{x/n}[(AlO_2)_x(SiO_2)_y] \cdot m H_2O$, with x≤y. In this chemical formula, n indicates the oxidation number of the cation M. The cation M is, but is not limited to, alkali metal, alkaline earth, rare earth, ammonia or hydrogen ion.

In this embodiment, the zeolite suspension is prepared by mixing 16.04 g tetramethylammonium hydroxide (TMAOH) with 25.35 g pure water, followed by adding 3.835 g aluminum isopropoxide and 6.009 g silicon dioxide and stirring for 24 hours. Next, the reaction mixture is placed in a sealed container and reacts for 48 hours under 92° C. The reacted product is centrifuged at a low speed (e.g. 3000 rpm, 30 min) for removing large particles precipitated and is further centrifuged at a high speed (e.g. 12000 rpm, 30 minutes) to remove small particles in the supernatant. About 20 ml of such zeolite suspension is thus obtained with its pH value being about 11.

Furthermore, with the ion-exchange capacity of zeolite, metal ions having high electric conductivity can be introduced into the zeolite nanocrystals, such that the specific capacitance of the graphene composite film can be improved. For instance, the metal ion can be selected from gold ion, platinum ion, silver ion, copper ion and nickel ion, which can be readily appreciated by persons ordinarily skilled in the art. As an example, the zeolite suspension can further include a metal salt, such that the metal ion of the metal salt can enter the zeolite nanocrystals. In this embodiment, 1 M aqueous solution of silver nitrate is added to the zeolite suspension to reach a weight ratio of 0.3%. The zeolite suspension containing silver nitrate is placed in a sealed plastic container and sonicated (e.g. with ultrasound) for 8 hours at 80° C. in a dark place. Finally, the pH value of the zeolite suspension containing silver nitrate is adjusted to 11 using an ammonium solution.

The graphene oxide suspension in step (b) includes the graphene oxide with a concentration of 50-200 ppm. The graphene oxide suspension can be prepared through, but is not limited to, any known method in the art, such as mixing a carbon source material (e.g. graphite) with an oxidant, and then filtering and washing the oxidized carbon material. In this embodiment, 0.2 g flake graphite is mixed with 12 ml concentrated sulfuric acid by stirring 1 hour in an ice bath. Then, 2 g potassium permanganate is added, and the reaction mixture is stirred for one more hour. Next, the reaction mixture is stirred for one hour at 40° C. before adding 25 ml pure water. After adding pure water, the reaction mixture is transferred to 95-98° C. and stirred for 15 minutes, followed by adding hydrogen peroxide until there is no bubbles generated in the reaction mixture. The reaction mixture is then centrifuged (12000 rpm, 15 min) before cooling down and is washed until reaching a pH value of 4. Finally, the reaction mixture is further sonicated (e.g. with ultrasound) until there is no apparent particles, thus forming the graphene oxide suspension.

Next, step (c) is carried out. In step (c), the graphene oxide is partially reduced to form partially-reduced graphene oxide. Namely, each graphene oxide particle is partially reduced, such as being reduced on the plane, with the peripheral area thereof still being oxidized. Since graphene is brownish-yellow in the oxide state and black in the further reduced state, the color of the composite solution containing the graphene oxide suspension turns from brownish-yellow into deep brown (in an example, the color of the graphene oxide suspension turns from PANTONE 124 to PANTONE 1405.), indicating that the surface functional groups of the graphene oxide started the reduction reaction. The van der Waal's force between molecules is increased after reduction of the surface functional groups. Thus, a plurality of reduced layers starts to form on the surface of graphene oxide. Namely, the partially-reduced graphene oxide is formed, which can be appreciated by one having ordinary skill in the art.

The term "partially-reduced graphene oxide" indicates a deep brown product obtained after the reduction reaction of the graphene oxide and before obtaining black graphene (further reduced graphene). Specifically, a reducing gas is introduced into the graphene oxide suspension to conduct the reduction reaction. Alternatively, a reductant is added into the graphene oxide suspension, with the reductant being, but not being limited to, a well-known reductant suitable for reducing graphene oxide. Besides, the reductant can be a basic compound, such as hydrazine, to cooperate with the pH value of the zeolite suspension. Alternatively, an alkali can be added into the zeolite suspension which is then sonicated at 50-90° C. The alkali can be lithium hydroxide, sodium hydroxide, potassium hydroxide or calcium hydroxide to provide a reductive environment. These alkalis are less detrimental to the environment and provide a slower reduction rate without causing defects in the partially-reduced graphene oxide while permitting easier control of the reduction rate.

In this embodiment, tetramethylammonium hydroxide (TMAOH) in the zeolite suspension is used as the reductant. The graphene oxide suspension is mixed with the zeolite suspension according to a volume ratio of 1:1 to 9:1 to form a composite solution. The composite suspension is sonicated at 50° C. until the composite solution turns from brownish-yellow into deep brown. At this time, to prevent the deep brown graphene in the composite solution from continuingly proceeding with reduction reaction with the reductant, the deep brown composite solution is transferred into a 15° C. water bath to slow down the reduction rate of the deep brown graphene and the reductant in the composite solution. When the temperature of the composite solution reaches 15° C., the deep brown color can be maintained without becoming deeper.

To assist in explanation and understanding of the embodiments according to the present invention, the reduction state of the graphene is defined by color. Specifically, the graphene oxide is referred to as "brownish-yellow graphene", the partially-reduced graphene is referred to as "deep brown graphene", and the further reduced graphene is referred to as "black graphene". The above colors are defined by TANTONE color strips. For example, brownish-yellow is represented by PANTONE 124, deep brown is represented by PANTONE 1405, and black is represented by PANTONE 433 2X.

brownish-yellow is represented by PANTONE 124, deep brown is represented by PANTONE 1405, and black is represented by PANTONE 433 2X.

In step (d), a surfactant is added into the deep brown composite solution. In an example, 20 ml of 1-methy-2-pyrrolidone (NMP) is added into the deep brown composite solution still placed in the 15° C. water bath. Theoretically, the deep brown graphene still possesses excellent suspension properties, such that precipitation would not occur after 15 minutes of centrifugation under 10000 rpm. Nevertheless, the method according to the present invention further uses 1-methy-2-pyrrolidone (NMP) as a surfactant to further assure the deep brown graphene in the composite solution to maintain the suspension state, providing an excellent dispersion effect for each component in the composite solution. In addition to 1-methy-2-pyrrolidone (NMP), isopropanol, propylene glycol methyl ether (PGME), ethyl acetate or methyl ethyl ketone (MEK) can be used as the surfactant.

In step (e), the deep brown composite solution is further reduced. The composite solution in step (d) contains the reductant to proceed with the reduction reaction, reducing the deep brown graphene to the black graphene. In an example, after addition of the surfactant, the composite solution is sonicated for 15 minutes to turn inhomogeneous color distribution of the deep brown graphene and the reductant in the composite solution into homogenous. After removing the composite solution out of the 15° C. water bath, the deep brown graphene in the deep brown composite solution continues to undergo a reduction reaction with the tetramethylammonium hydroxide (TMAOH). In an example, the composite solution removed out of the 15° C. water bath is sonicated for 12-24 hours at 50-90 ° C. to increase the reaction rate of the deep brown graphene and the reductant in the composite solution, providing a complete reaction to form the black graphene. Since the composite solution includes zeolite nanocrystals and incompletely reduced graphene, the porous tri-dimensional structure of the zeolite and the functional groups of the graphene oxide generate a weak attraction force similar to the van der Waal's force during the reduction reaction. This avoids the deep brown graphene from excessively aggregating and the subsequent formation of a multilayer structure due to excessively rapid stacking during the reduction reaction. Furthermore, the surfactant in the composite solution contributes to a more uniform dispersion of the deep brown graphene in the composite solution, such that the deep brown graphene can form the black graphene slowly and densely during the reduction reaction. Thus, the number of the resultant graphene layers is not more than 5 to improve the electrical properties.

After step (e), step (f) is carried out to atomize the composite solution to form atomized droplets. Specifically, after the composite solution completely turns from deep brown into black, which means the partially-reduced graphene has been further reduced, the composite solution is atomized to form atomized droplets. In a non-restive example, the composite solution is atomized to form atomized droplets via an atomizer, such as an ultrasonic oscillator or the like, as would be appreciated by persons ordinarily skilled in the art. At the time the atomized droplets are formed, the graphene surrounds the zeolite nanocrystals to form a structure similar to a graphene ball.

Next, step (g) is carried out to treat the atomized droplets with a plasma to charge the atomized droplets. Specifically, the atomized droplets are treated by a plasma and are then deposited on a substrate to form the graphene composite film via plasma-enhanced atomizing deposition. For instance, the atomized droplets are carried by an inert gas (e.g. argon or helium) or a mixed gas (e.g. Ar/H2 mixture) through the plasma and deposited on the substrate, with the temperature of the substrate being 150-350° C. Through plasma treatment, the zeolite nanocrystals can be activated, the cross linking between the graphene and the zeolite nanocrystals is enhanced, and the adhesion between the graphene composite film and the substrate is enhanced. In this embodiment, the temperature of the substrate is 230° C. An atmospheric plasma system is used to generate the plasma by applying a voltage of 60-90V. Alternatively, a pulsed AC voltage can be used. Besides, in this embodiment, argon is used to carry the atomized droplets, and the flow rate of argon is set at 6-10 Um. Meanwhile, the flow rate of the atomized droplets is about 60-100 ml/min. These factors can be adjusted according to requirements of the graphene composite film, such as the desired thickness of the graphene composite film, which is not limited in the present invention.

Thus, by using the method for manufacturing the graphene composite film according to the present invention, the graphene surrounds the zeolite nanocrystals, and, then, the graphene and the zeolite nanocrystals jointly form the graphene composite film with a smooth surface. Besides, the graphene has fewer layers and is dense and, thus, has improved electrical properties. Consequently, the graphene composite film has a lot of advantages, such as an enhanced adhesion with the substrate, a smooth surface and improved electrical properties To prove that the method according to the present invention can manufacture the graphene composite which has characteristics of both the zeolite nanocrystals and the graphene and which has a smooth surface and excellent electrical properties, the following experiments are carried out.

(A) Comparison of Graphene Quality

The experiment is carried out to prove that the graphene composite film manufactured according to the present invention has fewer layers and fewer defects. The zeolite suspension and the graphene oxide suspension are initially prepared according to the above method. In Group A1, the zeolite suspension is added into the brownish-yellow graphene oxide suspension to form a composite solution containing the deep brown, partially-reduced graphene oxide. Then, the deep brown composite solution is placed into a 15° C. water bath. Next, a surfactant is added. Then, the composite solution is removed out of the 15° C. water bath to permit the deep brown graphene in the composite solution to continue the reduction reaction with tetramethylammonium hydroxide (TMAOH), forming the black graphene. In Group A2, brownish-yellow graphene oxide is added with an alkali to further reduce into the black graphene. Then, the zeolite suspension and the surfactant are added. Light transmittances of Group A1 and Group A2 are detected and recorded as shown in Table 1 below.

TABLE 1

Light Transmittance of Group A1 and Group A2

| Sample | Transmittance (%) |
|---|---|
| Group A1 | 86 |
| Group A2 | 65 |

Since the light transmittance of graphene correlates to its layer number and defect amount, the higher the transmittance, the fewer the layer number and defect amount. According to Table 1, in Group A1, the brownish-yellow graphene is partially reduced to deep brown graphene, the surfactant is added into the composite solution after the composite solution is placed in the 15° C. water bath, and the composite solution is then removed out of the 15° C. water bath to continue the reduction reaction. The black graphene obtained from Group A1 has a high transmittance, fewer layers, and fewer defects. In contrast, in Group A2, the zeolite suspension and the surfactant are added after the brownish-yellow graphene has been further reduced, and the resultant graphene has lower transmittance, more layers, and more serious defects.

(B) Comparison of Morphology of Graphene Composite Film

The graphene oxide suspension and the zeolite suspension are prepared as described above and are mixed together according to the volume ratio of 7:3 to form a composite solution containing deep brown graphene. After 2 hours of ultrasonic treatment, 1-methy-2-pyrrolidone (NMP) is added to uniformly disperse the deep brown graphene in the composite solution. Next, the deep brown graphene in the composite solution continues to react with tetramethylammonium hydroxide (TMAOH) until the deep brown graphene is further reduced to black graphene. The composite solution is further used to manufacture the graphene composite film of Group B1 via plasma-enhanced atomizing deposition. Another graphene composite film is manufactured using the same composite solution but using spin coating for comparison, which is taken as Group B2.

Figure 1B:
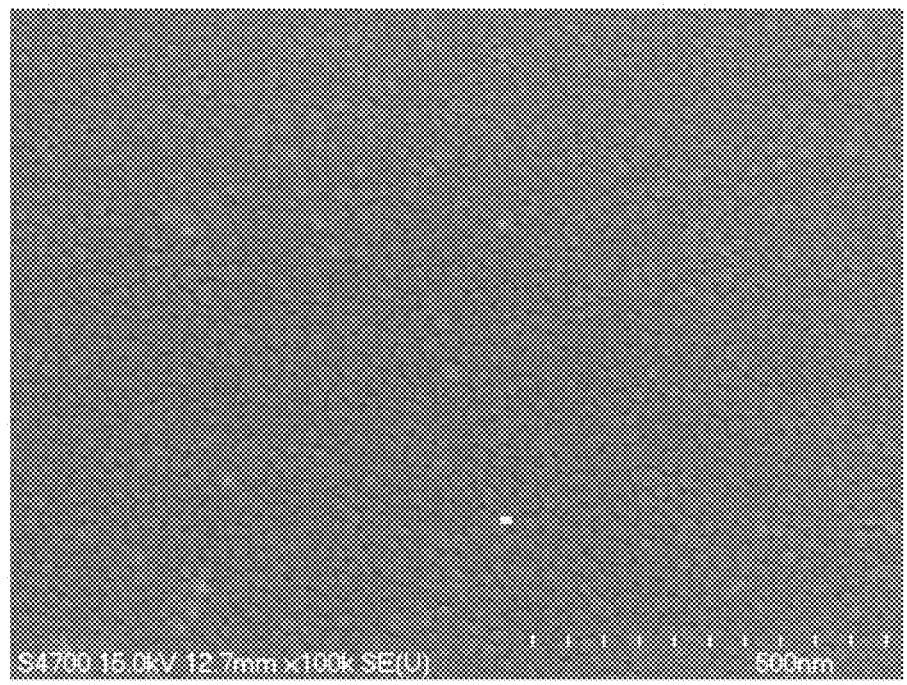
FIG. 1b is a 100,000×SEM image of the graphene composite film of Group B1.
Figure 1C:
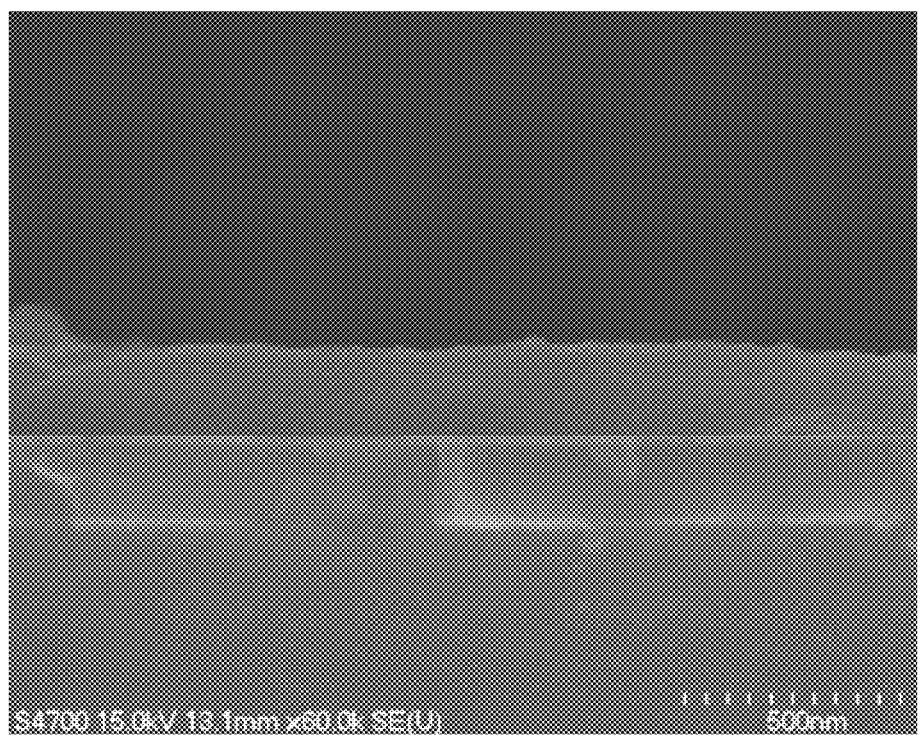
FIG. 1c is a cross sectional SEM image of the graphene composite film of Group B1.
Figure 2A:
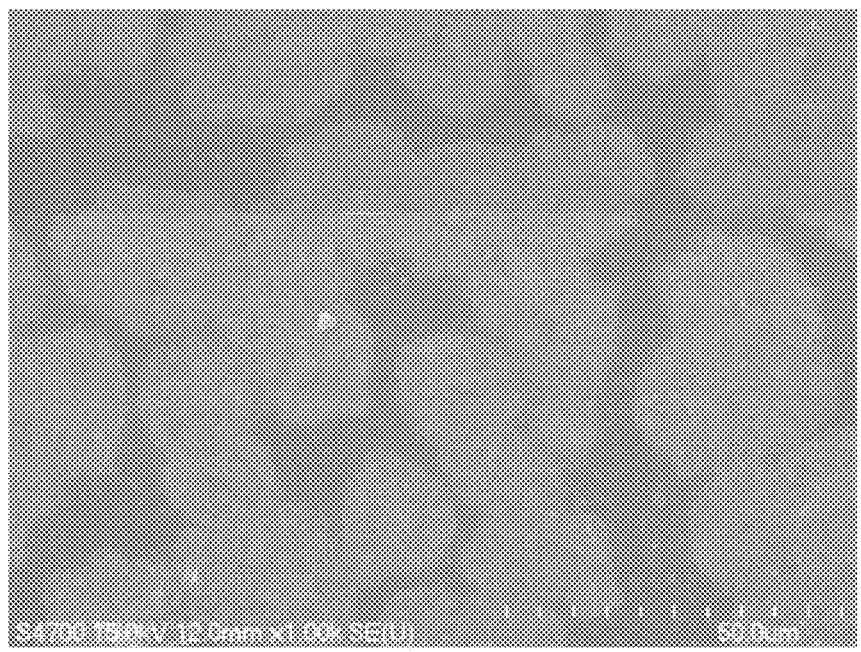
FIG. 2a is a 1,000×SEM image of the graphene composite film of Group B2.
Figure 2B:
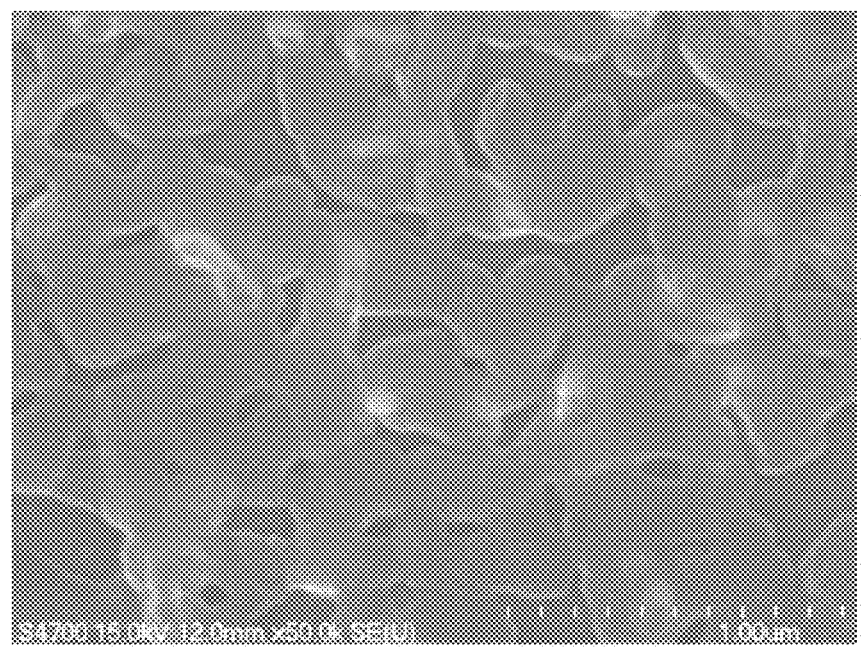
FIG. 2b is a 50,000×SEM image of the graphene composite film of Group B2.
Figure 2C:
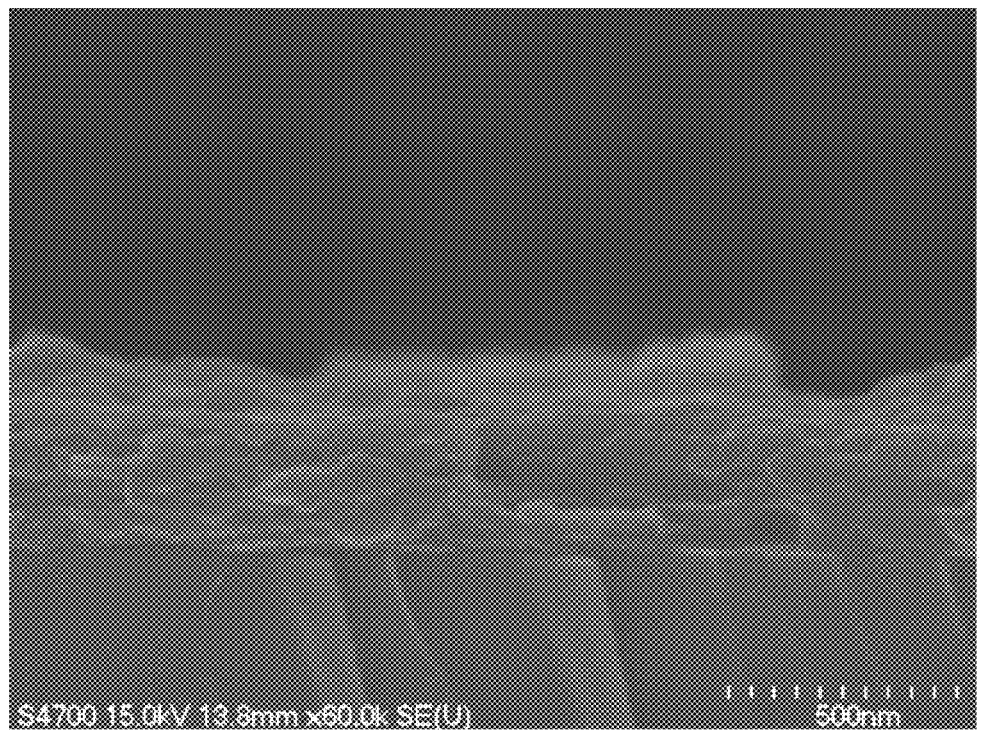
FIG. 2c is a cross sectional SEM image of the graphene composite film of Group B2.

Please refer to FIGS. 1a and 1b, which are the 1,000× and 100,000×SEM images of the graphene composite film of Group B1. FIG. 1c is the cross sectional SEM image of the graphene composite film of Group B1. In addition, FIGS. 2a and 2b are the 1,000× and 50,000×SEM images of the graphene composite film of Group B2, and FIG. 2c is the cross sectional SEM image of the graphene composite film of Group B2. According to these images, the graphene composite film manufactured by the method according to the present invention has a smooth surface. Besides, uniformly distributed particles can be seen in the magnified image, indicating that the graphene and the zeolite nanocrystals are combined together to form the graphene composite film. In contrast, the graphene composite film manufactured via spin coating shows significant aggregation and has a rough surface and an uneven thickness.

Figure 3A:
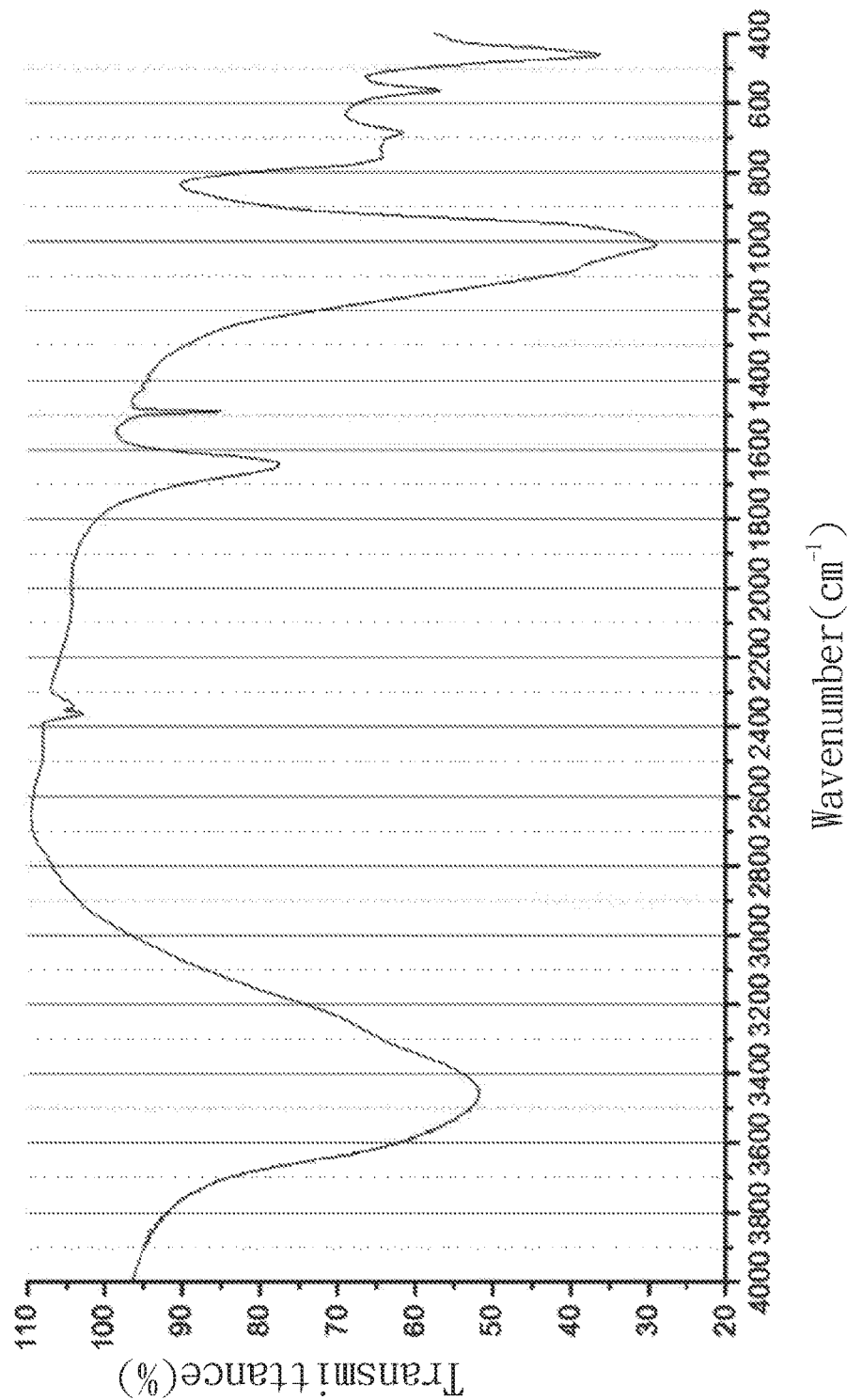
FIG. 3a is an FT-IR spectrum of graphene oxide.
Figure 3B:
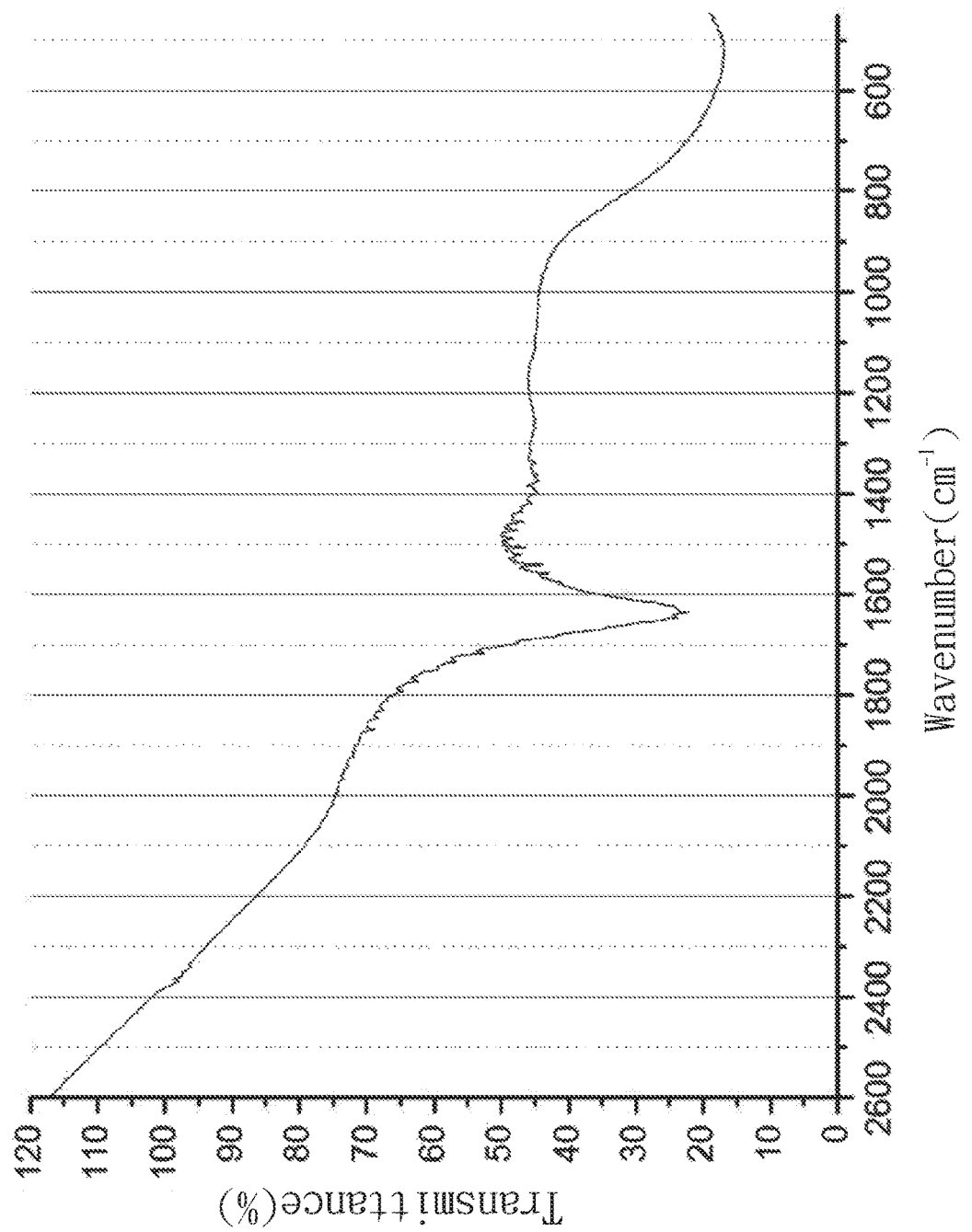
FIG. 3b is an FT-IR spectrum of graphene.
Figure 3C:
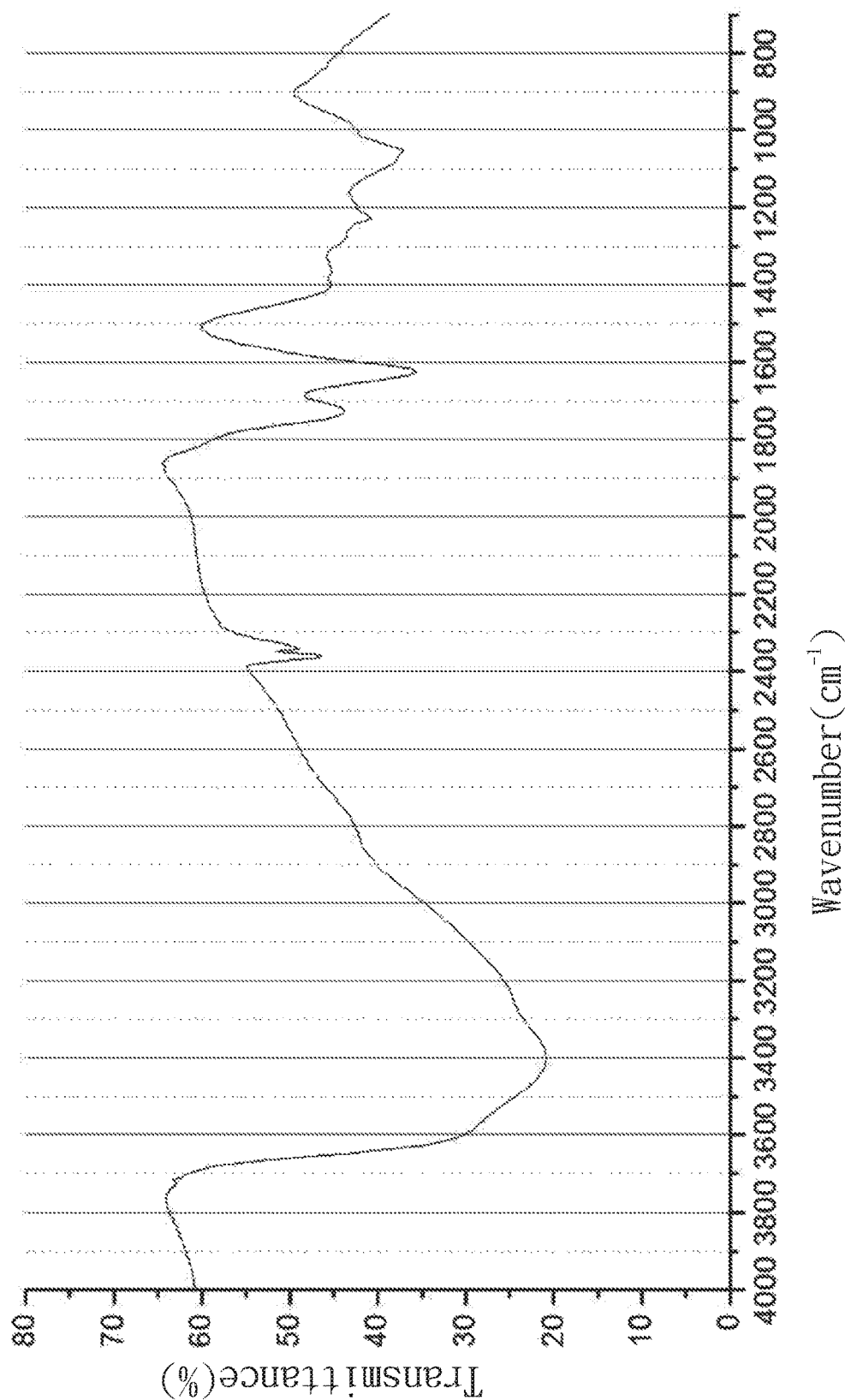
FIG. 3c is an FT-IR spectrum of zeolite.
Figure 3D:
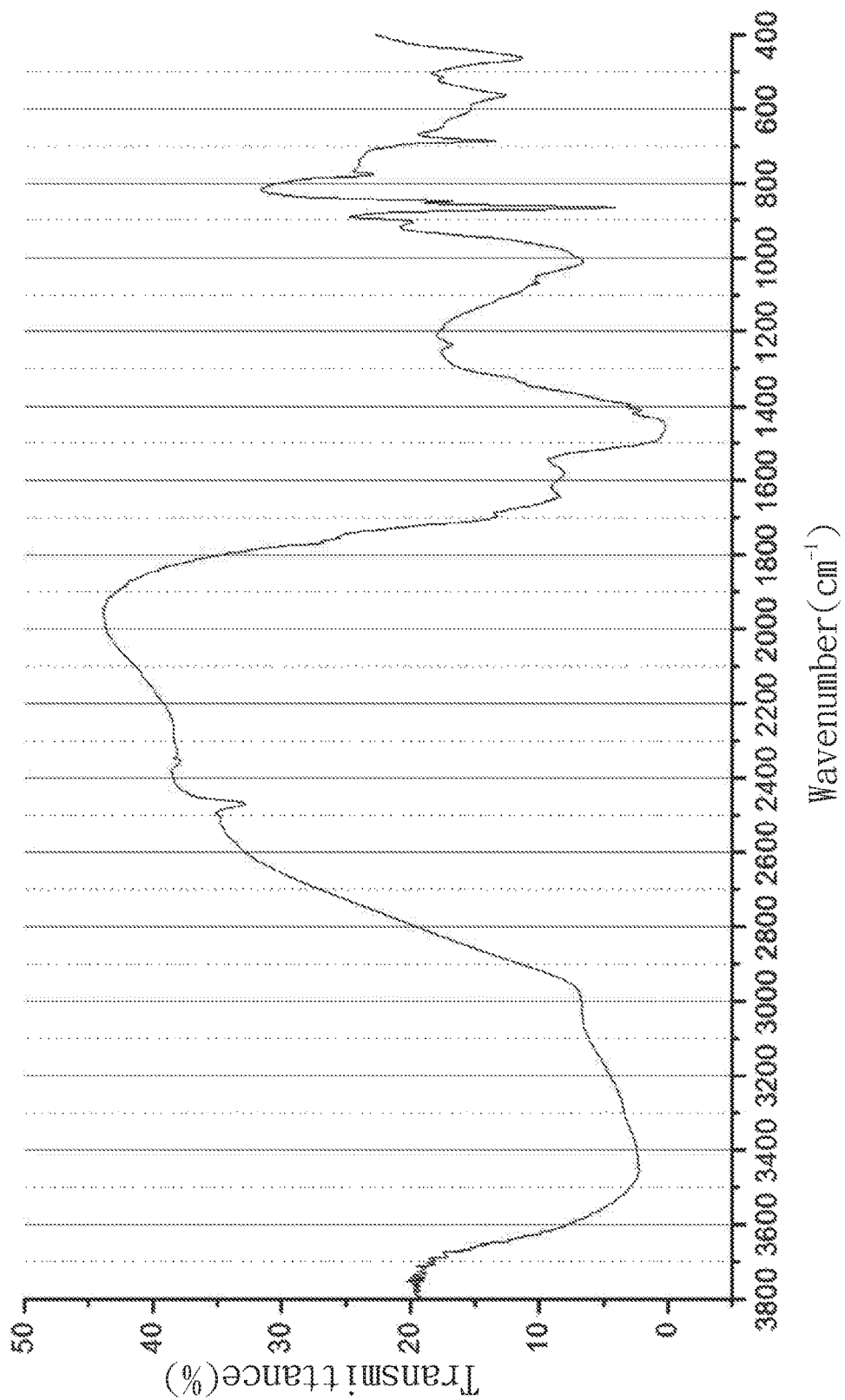
FIG. 3d is an FT-IR spectrum of the graphene composite film obtained from the method according to the present invention.

(C) Analysis of Chemical Properties and Composition of the Graphene Composite Film The graphene oxide suspension containing graphene oxide as described above is taken as Group C 1. In Group C2, the brownish-yellow graphene oxide suspension is directly reduced to form the black graphene suspension. The zeolite suspension described above is taken as Group C3, and the composite solution of Group B1 described above is taken as Group C4. Group C1 to Group C4 are subject to a plasma-enhanced atomizing deposition to produce thin films, and the FT-IR spectrums of the thin films are shown in FIGS. 3a-3d. With references to FIGS. 3a and 3b (Group C1 and C2), it can be seen that the peak at 1414 cm$^{-1}$ disappears when the brownish-yellow graphene oxide is completely reduced to black graphene. Referring to FIG. 3d (Group C4), when comparing with FIGS. 3a-3d, it is clear that the graphene composite film produced by the method according to the present invention possesses the characteristics of graphene (the peaks at 1620-1680 cm$^{-1}$) and the characteristics of zeolite (the peaks at 500-700cm$^{-1}$). Besides, the graphene oxide has been completely reduced to graphene.

The graphene composite film of Group C4 is further analyzed using an energy dispersive spectrometer (EDS), and the ratio of C/Si is about 2.2, which matches with the volume ratio of the graphene oxide suspension and the zeolite suspension. Hence, it can be appreciated that the graphene and the zeolite nanocrystals are combined together according to such volume ratio during formation of the atomized droplets, subsequently forming the graphene composite film with uniformly distributed graphene and zeolite nanocrystals.

(D) Analysis of Electrical Properties of the Graphene Composite Film

Black graphene (same as Group C2) is taken as Group D1, and the zeolite suspension (same as Group C3) is taken as Group D2. Besides, the zeolite suspension containing silver ions introduced as described above is taken as Group D3. The composite solution produced from the method according to the present invention (same as Group C4) is taken as Group D4. The composite solution containing silver ions produced from the method according to the present invention is taken as Group D5. Group D1 to Group D5 are subject to a plasma-enhanced atomizing deposition to form thin films. The specific capacitance with or without electrolyte (1 M potassium hydroxide aqueous solution) of each thin film is detected and recorded in Table 2 below.

TABLE 2

Specific Capacitance of Group D1 to Group D5

| Sample | Specific Capacitance (F/g) without Electrolyte | Specific Capacitance (F/g) with Electrolyte |
|---|---|---|
| Group D1 | 10$^{-2}$ | 145 |
| Group D2 | 1.3 × 10$^{-6}$ | 5.2 |
| Group D3 | 9.3 × 10$^{-6}$ | 25 |
| Group D4 | 10$^{-2}$ | 120 |
| Group D5 | 3 × 10$^{-2}$ | 185 |

According to the results shown above, the specific capacitance of the graphene composite film produced from the method according to the present invention (Group D4) approximates that of black graphene (Group D1). The specific capacitance of the zeolite nanocrystals having introduced silver ions (Group D3) is larger than that of the pure zeolite nanocrystals (Group D2). In addition, the graphene composite film manufactured with the zeolite nanocrystals having silver ions introduced according to the method according to the present invention (Group D5) can further improve the electrical properties of the graphene composite film, thus having the specific capacitance greater than that of the graphene composite film without silver ions introduced according to the method according to the present invention (Group D4).

Figure 4:
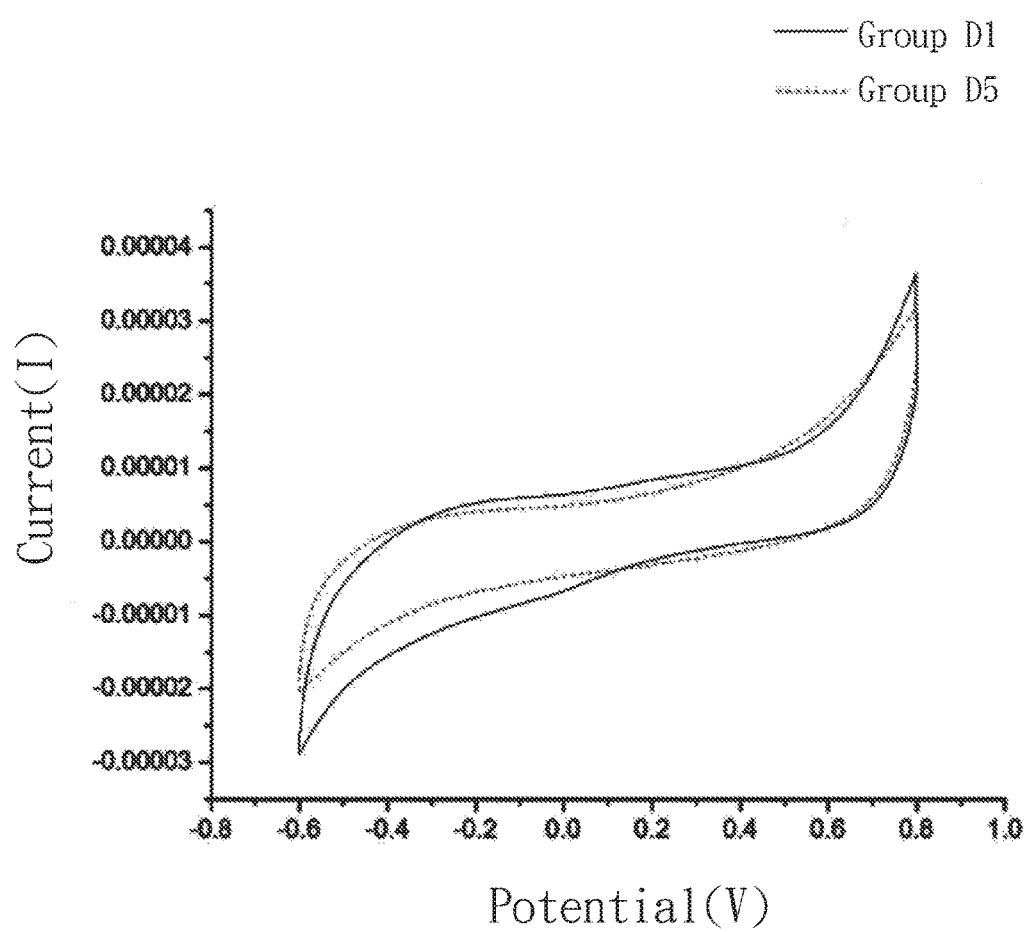
FIG. 4 is the cyclic voltammetry results of Group D1 and Group D5.

The films of Group D1 and Group D5 are further analyzed via cyclic voltammetry, and the results are provided in FIG. 4. Within the range of −0.6 to −0.2 V, it can be seen that the current variation of the graphene composite film produced from the method according to the present invention (Group D5) is more stable than that of the pure graphene (Group D1).

In light of the above, according to the method for manufacturing the graphene composite film of the present invention, the alkaline zeolite suspension is added during the procedure for reducing the graphene oxide to graphene and, thus, can not only serve as a reductant but contributes distribution of zeolite nanocrystals between two adjacent graphene layers in the composite solution. Furthermore, the composite solution is placed in a 15° C. water bath to slow down the reduction rate, and a surfactant is added to provide a better dispersion effect of the graphene oxide and the zeolite nanocrystals in the composite solution, thereby controlling the reduction rate of reducing graphene oxide to graphene. Thus, the resultant graphene has fewer layers and fewer defects, improving the electrical properties of the graphene.

Besides, in the method according to the present invention, since the graphene composite film is formed from the composite solution via plasma-enhanced atomizing deposition, the graphene surrounds the zeolite. Consequently, the zeolite nanocrystals and the graphene can jointly form the graphene composite film with a smooth surface and a uniform thickness, improving the applicability of the graphene composite film.

Moreover, in the method according to the present invention, since the metal salt is added to the zeolite suspension, the metal ion can be introduced into the zeolite nanocrystals, thus increasing the specific capacitance of the graphene composite film.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A method comprising:
    (a) preparing a zeolite suspension containing zeolite nanocrystals with a concentration of 50-100 ppm, wherein a particle size of the zeolite nanocrystals is 50-80 nm, and wherein the zeolite suspension has a pH value of 11-13;
    (b) preparing a graphene oxide suspension containing graphene oxide with a concentration of 50-200 ppm;
    (c) mixing the graphene oxide suspension with the zeolite suspension according to a volume ratio of 1:1 to 9:1 to form a composite solution and transferring the composite solution into a 15° C. water bath when a color of the composite solution turns from brownish-yellow represented by PANTONE 124 into deep brown represented by PANTONE 1405;
    (d) adding a surfactant into the composite solution in the 15° C. water bath;
    (e) sonicating the composite solution after adding the surfactant for 5-30 minutes and removing the composite solution out of the 15° C. water bath, with the color of the composite solution turning from deep brown into black;
    (f) atomizing the composite solution after sonicating the composite solution to form atomized droplets;
    (g) treating the atomized droplets with a plasma to charge the atomized droplets; and (h) depositing the charged atomized droplets on a substrate having a temperature of 150-350° C., forming a graphene composite film having not more than 5 layers.

2. The method as claimed in claim 1, wherein sonicating the composite solution comprises sonicating at 50-90° C. to turn the color of the composite solution from brownish-yellow into deep brown.

3. The method as claimed in claim 2, further comprising after removing the composite solution out of the 15° C. water bath, sonicating the composite solution at 50-90° C. for 12-24 hours to turn the color of the composite solution from deep brown into black.

4. The method as claimed in claim 1, wherein the surfactant is 1-methy-2-pyrrolidone (NMP), isopropanol, propylene glycol methyl ether (PGME), ethyl acetate or methyl ethyl ketone (MEK).

5. The method as claimed in claim 1, wherein the zeolite suspension further comprises a metal salt.

6. The method as claimed in claim 5, wherein the metal salt is a salt of gold, platinum, silver, copper or nickel.

7. The method as claimed in claim 1, further comprising before adding the surfactant, sonicating the composite solution for 1-3 hours.

8. The method as claimed in claim 1, wherein treating the atomized droplets comprises using a gas to carry the atomized droplets through the plasma to charge the atomized droplets.

9. The method as claimed in claim 8, wherein the gas is argon, helium or a mixed gas comprising argon and hydrogen.

* * * * *